(12) United States Patent
Hanses et al.

(10) Patent No.: US 10,097,814 B2
(45) Date of Patent: Oct. 9, 2018

(54) FIRE MONITORING SYSTEM

(71) Applicant: Robert Bosch GmbH, Stuttgart (DE)

(72) Inventors: Thomas Hanses, Feldkirchen-Westerham (DE); Joerg Turner, Ebersberg (DE)

(73) Assignee: Robert Bosch GmbH, Stuttgart (DE)

( * ) Notice: Subject to any disclaimer, the term of this patent is extended or adjusted under 35 U.S.C. 154(b) by 527 days.

(21) Appl. No.: 13/949,634

(22) Filed: Jul. 24, 2013

(65) Prior Publication Data

US 2014/0028803 A1 Jan. 30, 2014

(30) Foreign Application Priority Data

Jul. 26, 2012 (DE) .................... 10 2012 213 125

(51) Int. Cl.
*H04N 13/02* (2006.01)
*H04N 13/282* (2018.01)
*G08B 17/12* (2006.01)

(52) U.S. Cl.
CPC ......... *H04N 13/282* (2018.05); *G08B 17/125* (2013.01)

(58) Field of Classification Search
CPC . H04N 13/0282; G08B 17/125; G08B 29/185
USPC .......................................................... 348/47
See application file for complete search history.

(56) References Cited

U.S. PATENT DOCUMENTS

| | | | |
|---|---|---|---|
| 2003/0038877 A1* | 2/2003 | Pfefferseder et al. .......... | 348/82 |
| 2004/0175040 A1 | 9/2004 | Rizzotti et al. | |
| 2009/0315722 A1* | 12/2009 | Hou ..................... | G08B 17/125 340/578 |
| 2011/0058167 A1* | 3/2011 | Knox et al. ................... | 356/338 |
| 2011/0058706 A1* | 3/2011 | Xiong et al. ................. | 382/100 |

FOREIGN PATENT DOCUMENTS

| | | |
|---|---|---|
| DE | 20022869 | 6/2002 |
| DE | 102008001383 | 10/2009 |
| DE | 102011055665 A1 | 5/2012 |

* cited by examiner

*Primary Examiner* — Thai Q Tran
*Assistant Examiner* — Jose M Mesa
(74) *Attorney, Agent, or Firm* — Michael Best & Friedrich LLP

(57) ABSTRACT

A fire monitoring system 1 having at least a first and a second monitoring camera 4, 5 for outputting monitoring images 4.*a;* 5.1, wherein the viewing fields 6, 7 of the first and the second monitoring camera 4, 5 overlap in a common monitoring region 8, having an evaluation device 9 for identifying a fire 2, 3 in the monitoring images 4.1, 5.1 is constructed, wherein the evaluation device 9 is constructed to output positional information of the fire 2, 3 by way of evaluating the monitoring images 4.*a,* 5.1.

17 Claims, 2 Drawing Sheets

FIRE MONITORING SYSTEM

BACKGROUND OF THE INVENTION

The invention relates to a fire monitoring system having at least a first and a second monitoring camera for outputting monitoring images, wherein the viewing fields of the first and second monitoring cameras overlap in a common monitoring region, and having an evaluation device for identifying a fire in the monitoring images.

The scope of application for monitoring cameras has increased significantly over the years, as the development of cost-effective, reliable and fast computers has simplified automated evaluation of monitoring images of the monitoring cameras. The use of monitoring cameras which can identify a fire in an automated manner on the basis of optically identifiable fire emissions is also increasing in the field of fire monitoring.

Document DE 10 2008 001 383 A1, for example, proposes a detection apparatus for detecting fires and/or fire features in a monitoring region with a camera device. The camera device captures a very broad viewing-angle region, but wherein a viewing-angle partial region is masked and thus excluded from evaluation.

Document DE 200 22 869 U1 discloses a fire identification system for detecting visible and concealed sources of fire. In one embodiment of the fire identification system, the fire identification system comprises a video camera and an infrared camera, which observe the same viewing-angle region. The different types of camera make it possible to identify different fire features in the identical viewing region.

SUMMARY OF THE INVENTION

The fire monitoring system according to the invention comprises at least a first and a second monitoring camera, which are constructed to produce monitoring images. During operation, the first and the second monitoring camera are arranged such that their viewing fields overlap in a common monitoring region. The optical axes of the monitoring cameras are arranged at an angle and/or skewed with respect to one another. In particular, the monitoring region is recorded from different perspectives. In addition to the common monitoring region, the two monitoring cameras can optionally monitor additional regions, for example adjoining regions. Viewing fields are understood to mean those regions which are imaged on the monitoring images of the monitoring cameras.

The fire monitoring system is constructed to detect a fire in the monitoring region. To this end, the fire monitoring system has an evaluation device which is constructed to identify the fire in the monitoring images. For the identification of the fire, any desired fire features in the monitoring images, such as embers, flames, smoke, heated or glowing surfaces or bodies, can be evaluated.

Proposed in the context of the invention is that the evaluation device is constructed to output positional information, in particular three-dimensional positional information, for the fire by way of evaluating the monitoring images.

In addition to the detection of the fire by way of evaluating the monitoring images, the position of the fire is supplementarily ascertained by way of evaluating the monitoring images and output as positional information. The positional information for the fire can also relate to the position of a fire feature, in particular embers, flames, smoke etc. If, for example, the evaluation device identified a glowing surface as the fire feature of the fire, the position of the glowing surface is output as the positional information for the fire.

The invention has the advantage that, in addition to the detection of the fire, positional information is output at the same time, which advantageously has many uses:

Firefighters can thus be guided in a targeted manner to the fire indicated by the positional information in order to accelerate firefighting. It is also possible to initiate firefighting measures in an automated manner, such as the operation of a sprinkler system or parts thereof, at the actual position of the fire in order to thus minimize damage that could be caused by the firefighting measures. It is furthermore advantageous to know the position of the fire in order to carry out a risk analysis, for example to check if explosives are stored near the fire or if people are at risk or escape routes are cut off due to the position of the fire.

In a preferred realization of the invention, the positional information is determined by the evaluation device using stereo analysis of the monitoring images of the at least two monitoring cameras. Obtaining positional information and in particular 3D information using at least two cameras via stereo analysis is known. As an example of a disclosure of the geometric-optical foundations, reference is made to the scientific article by Hartley, R. and A. Zisserman, "Multiple View Geometry in Computer Vision" (Cambridge University Press, New York, USA, 2004).

In one possible procedure, the positional information for an object which is imaged in the monitoring images of the at least two monitoring cameras is determined by first determining the position of the image of the object in the monitoring images of the at least two monitoring cameras. This step is also referred to as finding correspondences.

In a next step, the three-dimensional position of the object is determined as the positional information on the basis of the position of the images in the monitoring images and with knowledge of camera parameters and of the position and alignment of the monitoring cameras.

The object, the positional information of which is determined, can in particular take the form of an object with fire features, such as an ember region, a smoke region, a flame region etc.

With particular preference, in a first step, the fire is identified in the monitoring images of both monitoring cameras and determined as the object in the monitoring images. In a next step, the positional information for the fire is ascertained, as has been previously described. In another embodiment, it is also possible for only one of the monitoring cameras to identify the fire and determine it as the object in the monitoring image. In the monitoring image of the other monitoring camera, a similar or identical object is chosen as the corresponding object.

It is possible for the at least two monitoring cameras to be arranged spatially very close to one another such that a small baseline is formed. The distance between the monitoring cameras, in particular the distance between the respective points of intersection of the optical axis with an objective of the monitoring cameras, is in this configuration chosen to be less than 50 cm. The at least or exactly two monitoring cameras can be arranged in particular in a common housing.

However, in order to obtain depth information which is as accurate as possible, and thus to obtain positional information, it is preferred for the first and the second monitoring camera to assume a distance of at least 1 m, preferably of at least 5 m and in particular of at least 10 m. Such a distance is also referred to as a large baseline. The correspondence problem for detecting corresponding objects in the monitoring images of the at least two monitoring cameras is exacerbated by the large distance. However, since a fire is a unique object in the monitoring images, this disadvantage is outweighed by the advantage that the positional information can be determined with greater accuracy.

With respect to the advantages mentioned in the introduction, it is preferred for the common monitoring region to extend over a length on a floor or a wall of the common monitoring region over at least 20 m, preferably over at least 50 m. With this order of magnitude of the monitoring region, the advantages of the invention are particularly pronounced, since, for example, in a hall having a length of 50 m and a fire at one end region of the hall, no firefighting activities are necessary at the other end region of the hall. It is possible in this example for only the first 5 m of the hall to be occupied with firefighting measures, for example.

In one possible embodiment of the invention, provision is made for at least one of the monitoring cameras, preferably both monitoring cameras, to be constructed as IR cameras. The IR cameras have in particular a wavelength capturing range of greater than 3 μm, preferably greater than 5 μm and in particular greater than 7 μm. Such monitoring cameras can be used to reliably detect even elevated temperatures, as will occur for example in the case of a concealed smoldering fire, as a fire feature.

In another possible embodiment of the invention, at least one of the monitoring cameras, preferably both monitoring cameras, are constructed as NIR cameras which are sensitive in a wavelength range of greater than 900 nm, in particular up to 3 μm. In this wavelength range, stray ambient light can be effectively blocked out such that only objects with very high temperatures are detected as a fire, in particular as fire features.

It is furthermore possible for at least one of the monitoring cameras, preferably both monitoring cameras, to be constructed as monitoring cameras in the visible range between 400 nm and 650 nm, with the fire being detected by image-content analysis.

It is particularly preferred for the fire, in particular the fire features, to be detected by evaluating a characteristic flickering of flames, a characteristic color of flames, a characteristic streak formation due to the development of smoke etc.

In one possible further development of the invention, the fire monitoring system comprises a masking module which is constructed to mask partial regions of the common monitoring region in at least one of the monitoring images and thus exclude them from the evaluation. Masking regions of this type can be used advantageously as partial regions if interfering objects, in particular moving interfering objects, are known to be present in the monitoring region. It is thus possible, for example, to exclude a crane moving through as an interfering object from the evaluation by masking the region through which the crane moves. The advantage of this development is a minimization of false alarms in the case of recurring, location-bound interfering variables or interfering objects.

In a very simple realization, which is thus easy to implement, the masking module is constructed to mask a 2D region in the monitoring image for each monitoring camera. A masking region of this type can be sketched in for example interactively by a user.

In a technologically more complex embodiment of the invention, the fire monitoring system comprises a modelling module, wherein a model, in particular a 3D model, of the common monitoring region is present in the modelling module and wherein the masking module is constructed to mask a 3D region in the model and thus exclude it from the evaluation. In this embodiment, a user can define a volume in the model and thus exclude interfering regions, in particular regions in which interfering objects are arranged, from the evaluation.

BRIEF DESCRIPTION OF THE DRAWINGS

Further features, advantages and effects of the invention can be gathered from the following description of a preferred exemplary embodiment of the invention and from the attached figures, in which.

DETAILED DESCRIPTION

Figure 1:
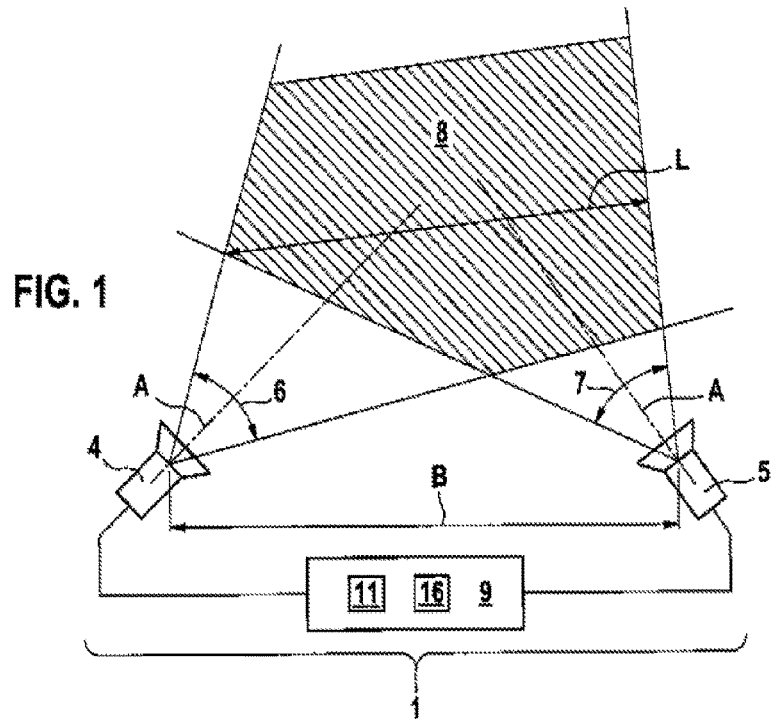
FIG. 1 shows a schematic block illustration of a fire monitoring system as a first exemplary embodiment of the invention.
Figure 2:
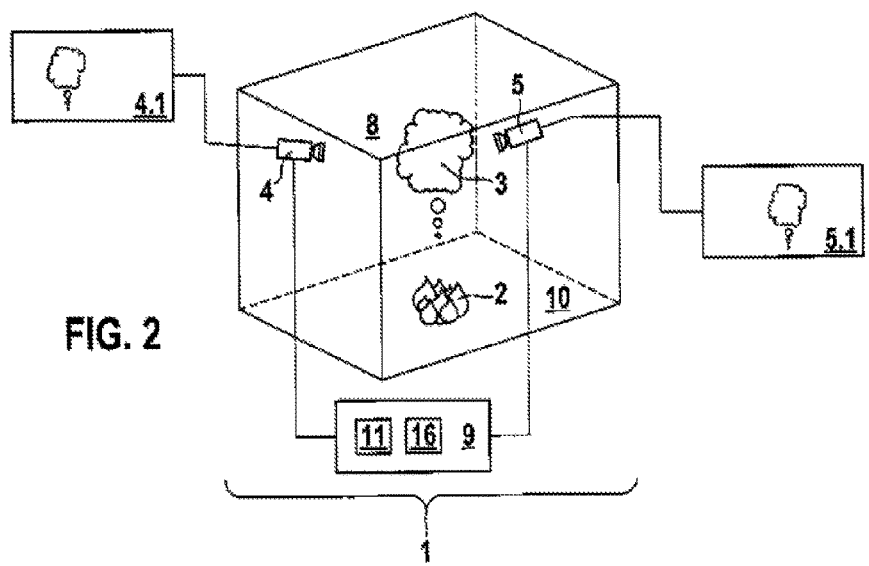
FIG. 2 shows a schematic three-dimensional illustration of the fire monitoring system in FIG. 1 during operation.

FIG. 1 illustrates, in a schematic block illustration, a fire monitoring system 1, which is constructed to identify a fire 2 (FIG. 2) and in particular fire features, such as smoke 3 (FIG. 2).

The fire monitoring system 1 comprises a first and a second monitoring camera 4, 5, the viewing fields 6 and 7 of which are aimed at a common monitoring region 8, such that their viewing fields 6, 7 overlap in the common monitoring region 8. The common monitoring region 8 has a maximum extent L, which is at least 10 m or 20 m. The common monitoring region 8 can be, for example, the interior of a machine hall, warehouse or even an external region.

The monitoring cameras 4, 5 are arranged to be spaced apart from one another, wherein a distance B, measured from the point of intersection of the optical axes A with an objective of the monitoring cameras 4, 5, is at least 1 m.

Figure 3:
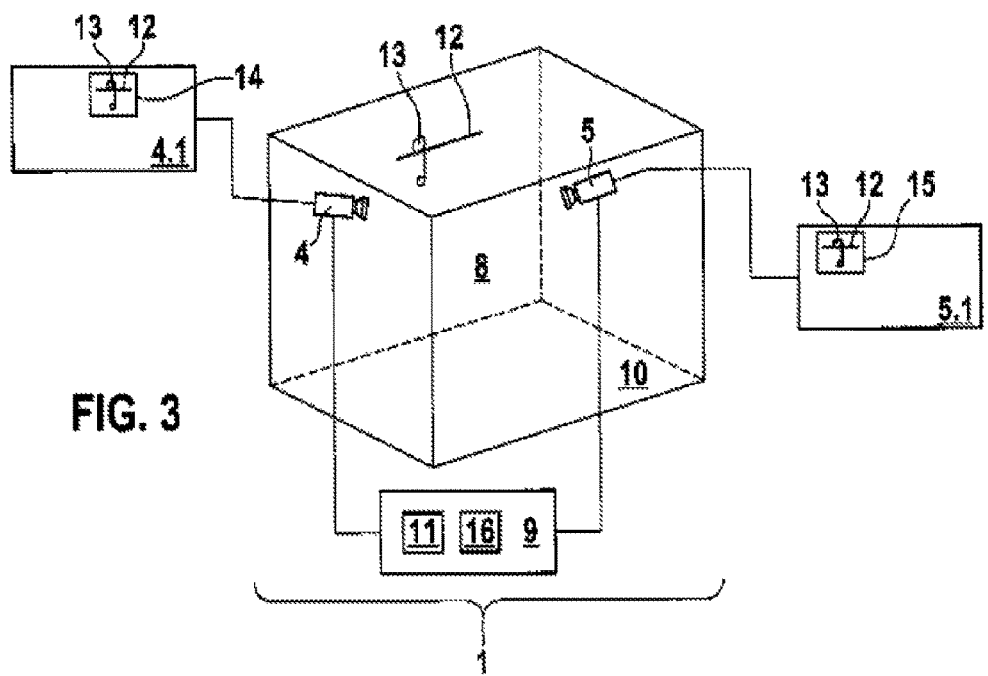
FIG. 3 shows, in the same illustration as in FIG. 2, a schematic illustration of the masking function of the fire monitoring system in the previous figures.

The first and the second monitoring camera 4, 5 in each case produce monitoring images, wherein each of the monitoring images displays the common monitoring region 8, but from different viewing angles or from a different perspective. The monitoring images of the first monitoring camera 4 are designated with 4.1, the monitoring images of the second monitoring camera 5 are designated with the reference sign 5.1 (FIGS. 2, 3).

The monitoring images 4.1, 5.1 are transmitted to an evaluation device 9, with the evaluation device being constructed to identify the fire 2, in particular the fire features such as the smoke 3, on the monitoring images 4.1, 5.1. The detection of the fire 2 or of the smoke 3 or of other fire features can be based on various principles:

First, the monitoring cameras 4, 5 can be constructed as thermal imaging cameras, in particular infrared cameras, such that they can detect the thermal radiation of the fire 2. In this embodiment, it is also possible for concealed fires 2 to be detected by sensing heated surfaces of other objects.

It is also possible for the monitoring cameras 4, 5 to be sensitive in the near infrared range, in particular in a range between 700 and 950 nm, such that very hot glowing objects, in particular with respect to normal ambient light, can be identified very easily and detected as a fire 2.

It is furthermore possible for the smoke 3 to be identified using image-content analyses, for example, by determining changes with respect to a reference image background.

After the fire 2 or fire features, in particular the smoke 3, have been detected as objects in at least one monitoring image 4.1, 5.1, preferably in both monitoring images 4.1, 5.1 of the two monitoring cameras 4, 5, the position, in particular the three-dimensional position of the fire 2 or of the fire features, in particular of the smoke 3, is ascertained using stereo analysis. This ascertainment is carried out in the knowledge of the position and the alignment of the monitoring cameras 4, 5 and of the parameters, such as for example focal distance, of the monitoring cameras 4, 5. The evaluation device 9 can output positional information of the fire 2 or of the fire features, in particular of the smoke 3, as a result.

This positional information defines the fire 2 or the fire features with respect to the position in the common monitoring region 8, for example as a three-dimensional coordinate. The positional information can, together with the fire detection warning, be transmitted for example to a monitoring center, which forms an optional component of the fire monitoring system 1, such that it is possible for countermeasures or rescue measures to be initiated centrally, either in an automated fashion or manually. One possible countermeasure is the activation of firefighting devices, such as a sprinkler system, wherein the monitoring center is constructed to activate the firefighting device selectively only in a partial region of the monitoring region 8 in which, according to the positional information, the fire 2 or the fire features, in particular the smoke 3, is/are located. Further partial regions of the common monitoring region 8 can remain free from firefighting measures.

Three or more firefighting devices can be arranged in the common monitoring region 8 by way of example in a spatially distributed manner, with only that firefighting device being activated, the firefighting region of which covers the location of the positional information. With these measures it is possible to selectively use firefighting measures and thus avoid or at least reduce damage to the monitoring region 8 by firefighting measures. Further advantages result from the utilization of the positional information with respect to the coordination of firefighters, in particular the evacuation of people in the common monitoring region 8 or of people, whose escape route runs through the common monitoring region 8.

FIG. 2 illustrates the fire monitoring system 1 in a schematic three-dimensional illustration, wherein the fire monitoring system is installed in a room 10. The monitoring cameras 4, 5 are arranged at a distance from one another and observe the common monitoring region 8, wherein a fire feature, in this case smoke 3, is present in the monitoring region 8. The smaller boxes illustrate the monitoring images 4.1 and 5.1, which both show the smoke 3 as the fire feature of the fire 2. These objects are thus identifiable as corresponding objects in both monitoring images 4.1, 5.1. Owing to the different positions of the objects in the monitoring images 4.1, 5.1, and with the knowledge of the camera position, alignment and parameters, it is possible to infer the three-dimensional positions of the object, that is to say the smoke 3, in the room 10. The positional information is given for example as XYZ position of the centroid or a nadir of the object, in particular the smoke 3.

FIG. 3 illustrates an optional function of the fire monitoring system 1, which is realized by a masking module 11, which forms part of the fire monitoring system 1, in particular of the evaluation device 9. The masking module 11 serves for masking temporarily interfering objects, in this example a crane 13 which is suspended on a rail 12 and moves through.

In a simplest embodiment, the masking module 11 permits masking regions 14, 15 to be input into the monitoring images 4.1, 5.1 interactively by the user, with the fire detection not being carried out by the evaluation device 9 in the masking regions 14, 15. This optional masking module 11 reduces the rate of false alarms by eliminating known interfering objects.

The fire monitoring system 1, in particular the evaluation device 9, comprises, as an optional addition, a modelling module 16, which contains a model of the common monitoring region 8. Such 3D models are known, for example, from building technology, architecture etc. In this embodiment, the user can input a three-dimensional masking volume, with no evaluation for detecting a fire 2, in particular fire features, such as smoke 3, being carried out in the masking volume, or not being pursued, due to the masking module 11.

The invention claimed is:

1. A fire monitoring system (1) comprising: a first and a second monitoring camera (4, 5) for outputting monitoring images (4.a; 5.1), wherein the viewing fields (6, 7) of the first and the second monitoring camera (4, 5) overlap in a common monitoring region (8) that extends over a length (L) on a floor or a wall, an evaluation device (9) for identifying a fire (2, 3) in the monitoring images (4.1, 5.1) wherein the evaluation device (9) is constructed to output positional information for the fire (2, 3) by way of evaluating the monitoring images (4.a, 5.1) using stereo analysis; and wherein a predetermined masking module (11) is constructed to mask partial regions (14, 15) in the common monitoring region (8) and thus exclude them from the evaluation.

2. Fire monitoring system (1) according to claim 1, characterized in that the first and the second monitoring camera (4, 5) assume a distance (B) of at least 1 m.

3. Fire monitoring system (1) according to claim 1, characterized in that the first and the second monitoring camera (4, 5) assume a distance (B) of at least 5 m.

4. Fire monitoring system (1) according to claim 1, characterized in that the first and the second monitoring camera (4, 5) assume a distance (B) of at least 10 m.

5. Fire monitoring system (1) according to claim 1, characterized in that the common monitoring region (8) extends over a length (L) on a floor or a wall of the common monitoring region of at least 20 m.

6. Fire monitoring system (1) according to claim 1, characterized in that the common monitoring region (8) extends over a length (L) on a floor or a wall of the common monitoring region of at least 50 m.

7. Fire monitoring system (1) according to claim 1, characterized in that at least one of the monitoring cameras (4, 5) is constructed as an IR camera.

8. Fire monitoring system (1) according to claim 1, characterized in that at least one of the monitoring cameras (4, 5) is constructed as an NIR camera.

9. Fire monitoring system (1) according to claim 1, characterized in that the fire (2) is identified using content analysis of the monitoring images (4.1, 5.1).

10. Fire monitoring system (1) according to claim 9, characterized in that the fire (2) is identified using content analysis of the monitoring images (4.1, 5.1) by evaluating a flickering and/or a color and/or streaks.

11. Fire monitoring system (1) according to claim 9, characterized in that the fire (2) is identified using content analysis of the monitoring images (4.1, 5.1) by evaluating a flickering.

12. Fire monitoring system (1) according to claim 9, characterized in that the fire (2) is identified using content analysis of the monitoring images (4.1, 5.1) by evaluating a color.

13. Fire monitoring system (1) according to claim 9, characterized in that the fire (2) is identified using content analysis of the monitoring images (4.1, 5.1) by evaluating streaks.

14. Fire monitoring system (1) according to claim 1, characterized in that the masking module (11) is constructed to mask a 2D region (14, 15) in the monitoring image (4.1; 5.1) for each monitoring camera (4, 5).

15. Fire monitoring system (1) according to claim 1, characterized by a modeling module (16), wherein a model of the common monitoring region (8) is arranged in the modeling module (16) and wherein the masking module (11) is constructed to mask a 3D region in the model and thus exclude it from the evaluation.

16. Fire monitoring system (1) according to claim 1, wherein the positional information for the fire which is imaged in the monitoring images of the first and second monitoring cameras is determined by first determining the position of the image of the fire in the monitoring images.

17. Fire monitoring system (1) according to claim 1, wherein the positional information is a three-dimensional position of the fire determined on the basis of the position of the images in the monitoring images and knowledge of camera parameters and of the position and alignment of the monitoring cameras.

* * * * *